United States Patent [19]

Bounini

[11] Patent Number: 4,752,538

[45] Date of Patent: Jun. 21, 1988

[54] METHOD FOR FORMING A LIGHTWEIGHT CEMENTITIOUS STRUCTURAL PRODUCT AND A PRODUCT FORMED THEREBY

[75] Inventor: Larbi Bounini, Libertyville, Ill.

[73] Assignee: United States Gypsum Company, Chicago, Ill.

[21] Appl. No.: 932,624

[22] Filed: Nov. 20, 1986

[51] Int. Cl.$^4$ ............... B32B 13/02; C04B 31/02; C04B 31/44

[52] U.S. Cl. ............... 428/703; 106/90; 106/97; 427/376.1; 428/407; 428/537.7

[58] Field of Search ............ 428/203, 49, 327, 407, 428/537.7; 106/90, 97; 427/376.1

[56] References Cited

U.S. PATENT DOCUMENTS

| | | | |
|---|---|---|---|
| 2,017,022 | 10/1935 | Roos | 106/23 |
| 2,080,009 | 5/1937 | Roos | 154/2 |
| 2,985,219 | 5/1961 | Summerfield | 154/1 |
| 3,021,291 | 2/1962 | Thiessen | 428/703 X |
| 4,011,355 | 3/1977 | Mandish et al. | 428/404 X |
| 4,238,242 | 12/1980 | Park | 428/404 X |
| 4,265,964 | 5/1981 | Burkhart | 428/306 |
| 4,331,734 | 5/1982 | Stegmeier | 428/404 X |

*Primary Examiner*—Nancy A. B. Swisher
*Attorney, Agent, or Firm*—Robert M. Didrick; Robert H. Robinson

[57] ABSTRACT

A method for producing a lightweight set cementitious product having excellent strength by forming a aqueous cementitious slurry, incorporating therein expandable polystyrene beads which are less than completely expanded, and heating the slurry to drive off excess water, to cause a cementitious mixture to set, and to further and completely expand the polystyrene beads. In a preferred embodiment and aqueous slurry of calcium sulfate hemihydrate is produced including expandable polystyrene beads in a state which they are partially but not fully pre-expanded. The slurry is deposited between two paper cover sheets, and the product is heated to drive off excess water, to set the gypsum to the solid dihydrate state, and to complete the expansion of the polystyrene beads until they reach their fully expanded state, thereby resulting in a strong lightweight gypsum wallboard which has excellent adhesion between the expanded polystyrene beads and the set gypsum.

19 Claims, No Drawings

METHOD FOR FORMING A LIGHTWEIGHT CEMENTITIOUS STRUCTURAL PRODUCT AND A PRODUCT FORMED THEREBY

BACKGROUND OF THE INVENTION

1. Field of the Invention

The present invention relates to the production of cementitious structural materials, and is more particularly concerned with the production of lightweight gypsum wallboard.

2. Description of the Prior Art

Gypsum wallboard is manufactured commercially by processes which are capable of operation under continuous high speed conditions. In carrying out these processes, an aqueous slurry of calcined gypsum and other conventional ingredients is continuously deposited between two moving sheets of paper. The gypsum forming the core between the two cover sheets is then allowed to set, and the resulting board is cut into panels of a desired length and passed through a drying kiln in which the excess water is removed and the gypsum brought to a final set. In the operation of high speed gypsum wallboard machines of the type utilized it is important that quick setting gypsum slurries are employed in order that production may be maintained at a suitable rate. Thus, as is well known, the calcined gypsum employed usually includes set accelerators so that the core of the board will be completely set within a short time after the slurry has been formed.

In the commercial manufacture of gypsum wallboard it is desired for some applications that the product be light in weight. This has been accomplished by incorporating a pre-generated tenacious foam directly into the gypsum and water slurry at the time that it is initially mixed. This procedure is well known in the art and is disclosed in Roos U.S. Pat. Nos. 2,017,022, dated Oct. 8, 1935, and in 2,080,009, dated May 11, 1937. In accordance with the disclosures in these patents, a pre-generated tenacious foam is admixed with the calcined gypsum and water under conditions to form a foamed slurry, and this slurry is then used for the manufacture of gypsum wallboard to produce a product having a lightweight cellular core.

In the manufacture of lightweight gypsum wallboard of the type described, the product is subjected to a drying operation in a kiln in order to remove any residual free water that may be left in the board. This kiln drying sometimes results in a weakening of the board at its edges due to the fact that some dehydration of the gypsum dihydrate may occur adjacent to the edges of the board, as a result of the surface area exposed to the drying operation adjacent the edges. This phenomenon occurs even though the raw edges of the core are covered by fold-over portions of the cover sheets.

Many attempts have been made to strengthen the edges of wallboard which has been foamed to make it lightweight. In U.S. Pat. No. 2,985,219, dated May 23, 1961, a process and apparatus are disclosed for strengthening the edges of the wallboard produced by utilizing foaming. In carrying out this process, a foamed gypsum slurry is prepared by conventional techniques under relatively mild conditions of blending or mixing such that the foam is not broken up to any substantial degree during the operation. Thereafter, at least a portion of the resulting slurry is intensely or violently mixed under conditions such that a substantial portion of the foam in the slurry is broken. During this supplemental mixing, additional foam is added to the mixer to replace at least a portion of the foam broken up in the supplemental mixing operation. The foamed slurry discharged from the supplemental mixture is deposited on a moving support of a conventional plasterboard machine, whereafter it is formed by a roller and passed through conventional setting, cutting and drying zones. This results in a product which is lightweight, but yet has strengthened edges.

In U.S. Pat. No. 4,265,964, dated May 5, 1981, lightweight gypsum wallboard is prepared by incorporating therein both a frothing agent and particles of completely expanded polystyrene beads. This results in a structure which is stated to provide low density without decreasing strength or causing undue brittleness of the finished product. However, the adhesion between the polystyrene beads and the gypsum is not adequate.

SUMMARY OF THE INVENTION

It is an object of the present invention to provide lightweight cementitious products such as cement board and gypsum wallboard panels.

It is a further object to provide lightweight cementitious products having good compressive strength properties.

It is still further an object of the invention to provide products of the type described which may be readily fabricated from readily available materials.

It is still further an object to provide lightweight cementitious products which are relatively inexpensive to produce.

The foregoing and other objects, advantages and characterizing features will become apparent from the following description of certain illustrative embodiments of the invention.

According to the invention, lightweight cementitious products such as cement board and gypsum wallboard panels are produced by forming an aqueous slurry of cement or gypsum, partially but not completely expanding polystyrene expandable beads, mixing the partially expanded beads into the slurry, depositing the slurry on a flat surface in a layer for forming panels, either bare or between paper cover sheets, permitting the cementitious product to set partially, and applying heat to the product to cause the cementitious material to set and dry, and causing the partially expanded polystyrene beads to expand further within the cementitious matrix. As a result a hardened panel is formed which is lightweight and which has a high compressive strength.

DESCRIPTION OF THE PREFERRED EMBODIMENTS

One of the most economical and widely used methods for reducing the density of cementitious casts is to add foam to the gypsum or cement slurry. However, the compressive strength of the casts relative to their density deteriorates as larger amounts of foam are used. The present invention provides lightweight fillers for cementitious products in the form of partially but not fully expanded plastic beads and flakes, including those formed of polystyrene, polyethylene, or copolymers thereof.

According to the present invention partially expanded beads are added to a slurry of cementitious material. The slurry is then cast onto a surface and dried, preferably by the addition of heat. The cast may be made with bare surfaces, or the slurry may be deposited between paper cover sheets to form gypsum wallboard. The object of the present method is to improve the mechanical adhesion at the filler-matrix interface by inducing expansion of the beads during or after the gypsum set. The partially expanded beads rapidly expand when the cast product is heated under humid conditions similar to those encountered during exothermic setting and/or drying of gypsum. The cast thus prepared is as a result actually reinforced by the beads.

EXAMPLES 1-16

A series of experiments was carried out to evaluate the performance of gypsum in slab form produced according to the method of the present invention in comparison to gypsum slabs formed utilizing a conventional foaming agent, and in comparison to gypsum slabs prepared with fully expanded polystyrene beads, as disclosed in U.S. Pat. No. 4,265,964. In each case the experiments were performed utilizing a conventional aqueous slurry of stucco (calcium sulfate hemihydrate). The fluidity and temperature rise set were maintained substantially the same in all samples in order to eliminate the effect of the latter two factors on compressive strength of the casts. The casts were prepared and dried at 110° F.

In Examples 1-7 a conventional foam was utilized for reducing density of the gypsum slab. The foam was pregenerated by intimately mixing air into a dilute aqueous solution of a conventional proprietary surfactant or foaming agent (MILLIFOAM).

In Examples 8-12 polystyrene beads were first partially pre-expanded to a density of 1.4 lb/ft$^3$. The partially expanded beads were then intimately mixed into the gypsum slurry and the slurry set and dried.

In Examples 13-16 polystyrene beads were completely pre-expanded to a density of 0.98 lb/ft$^3$. The expanded beads were then mixed into the aqueous stucco slurry, the slurry set and dried.

Table I below contains the data of the various experiments utilizing different proportions of ingredients and obtaining a final product of varying densities and varying compressive strengths.

Utilizing the data of Table I above, graphs were drawn in order to make a comparative study of compressive strengths obtained at comparable values of density of the resultant gypsum slab. Utilizing the graphs, values were interpolated for compressive strengths at comparable densities.

Table II below shows a comparisons of compressive strengths calculated for the various examples at comparable slab densities:

TABLE II

| Density lbs/ft$^3$ | Weight of ½" Gypsum Board lbs/10$^3$ ft$^2$ | Compressive Strength, psi | | |
|---|---|---|---|---|
| | | Foam | Fully Expanded Beads | Partially Expanded Beads |
| 42.5 | 1749 | 480 | 620 | 820 |
| 39.0 | 1614 | 460 | 480 | 630 |
| 34.0 | 1422 | 200 | 320 | 480 |

As shown in Table II above, keeping the density constant at 42.5 lbs/ft$^3$, corresponding to the general density of a one-half inch gypsum board, and replacing the foam with partially expanded beads increases the strength from 480 to 820 psi, constituting a 71% increase. When the compressive strength of 480 psi is maintained constant, replacing the foam with partially expanded beads decreases the density from 42.5 to 34.0 lbs/ft$^3$, or a 20% density reduction.

The data above also show that for comparable density the partially expanded beads according to the invention produced gypsum slabs having the highest compressive strength values. The data above also show that the use of foam to vary the density produced the lowest compressive strength values, while the use of fully expanded polystyrene beads produced compressive strengths which were intermediate between those of the casts produced with foam and those of the casts produced with the partially expanded beads of the present invention.

Plastic beads which are expandable with heat and steam include those formed of polystyrene, polyethylene, and copolymers thereof. The beads may be formulated to yield different densities when fully expanded. Beads useful for the present invention may be formulated to give a full expansion density of between 25 lbs/ft$^3$ and 0.50 lbs/ft$^3$. The preferred beads for practic-

TABLE I

| | | | | DRY CAST (Polystyrene Beads) | | | | | Compressive |
|---|---|---|---|---|---|---|---|---|---|
| Example | Stucco g | Water g | Foam cm$^3$ | Weight g | Density lb/ft$^3$ | Volume cm$^3$ | Set Time min. | Density lb/ft$^3$ | Strength psi |
| | | | | FOAM SYSTEM | | | | | |
| 1 | 1600 | 1300 | 0 | — | — | — | 13.75 | 62.80 | 2008 |
| 2 | 1600 | 1300 | 400 | — | — | — | 13.50 | 51.10 | 904 |
| 3 | 1600 | 1300 | 800 | — | — | — | 13.25 | 43.20 | 577 |
| 4 | 1600 | 1375 | 1000 | — | — | — | 11.25 | 42.20 | 549 |
| 5 | 1600 | 1300 | 1100 | — | — | — | 12.50 | 36.90 | 232 |
| 6 | 1600 | 1300 | 1600 | — | — | — | 12.75 | 32.00 | 184 |
| 7 | 1600 | 1300 | 3200 | — | — | — | 10.50 | 20.70 | 10 |
| | | | PARTIALLY EXPANDED POLYSTYRENE BEADS | | | | | | |
| 8 | 1600 | 1450 | — | 13.6 | 1.4 | 606.40 | 11.75 | 49.50 | 1057 |
| 9 | 1600 | 1502 | — | 27.2 | 1.4 | 1212.80 | 10.75 | 40.80 | 745 |
| 10 | 1600 | 1530 | — | 37.3 | 1.4 | 1663.10 | 10.00 | 38.40 | 610 |
| 11 | 1600 | 1605 | — | 54.3 | 1.4 | 2421.10 | 9.50 | 33.20 | 452 |
| 12 | 1600 | 1810 | — | 108.6 | 1.4 | 4842.20 | 7.50 | 23.30 | 193 |
| | | | FULLY EXPANDED POLYSTYRENE BEADS | | | | | | |
| 13 | 1600 | 1350 | — | 9.5 | 0.98 | 605.10 | 12.75 | 54.80 | 1354 |
| 14 | 1600 | 1402 | — | 19.0 | 0.98 | 1210.20 | 12.25 | 48.60 | 976 |
| 15 | 1600 | 1505 | — | 38.0 | 0.98 | 2420.40 | 12.00 | 40.50 | 580 |
| 16 | 1600 | 1710 | — | 76.0 | 0.98 | 4841.00 | 9.25 | 28.90 | 257 | ing the invention are those which when fully expanded, have a density of from 5 lbs/ft$^3$ to 0.75 lbs/ft$^3$.

In order to obtain the best results, the beads for practicing the present invention should be partially expanded to a density value that ranges from about 1.10 times the density value at full expansion to a density of 2.0 times the density at full expansion. The preferred density range is from about 1.25 to about 2.0 times the density of full expansion.

The proportions used of the partially expanded beads should be based on true volume of beads per weight of stucco, since the density of the beads may vary by a factor of 100, and since the properties of the gypsum cast may depend partially on the ability of the stucco (binder) to encapsulate the beads. The mix should range from about 0.1 cm$^3$ to about 650 cm$^3$ of partially expanded beads per 100 gm of stucco, preferably from 30 cm$^3$ to 400 cm$^3$ per 100 gm of stucco.

The present invention has many advantages. It provides the ability to manufacture high compressive strength gypsum wallboard and cement board having low density. By permitting weight reduction of the gypsum board, less stucco or calcium sulfate hemihydrate may be utilized, thereby saving a substantial amount of energy in addition to savings on shipping of the board. The present product provides increased sag resistance under humid and hot conditions. Water absorption is reduced by eliminating foam voids that act as water pockets when the wallboard is submerged. The boards have an increased insulation value. They also exhibit good nailability.

The present invention may be utilized additionally to produce strong lightweight cement board, wallboard having better sag resistance, sheathing board with low water absorption, high strength, lighweight and good insulation properties, and may be used with other products where foam is not practical, such as extrusion and pressing of gypsum or cement compositions.

Although the invention has been described in connection with specific embodiments thereof, it is evident that many alternatives, modifications, and variations will be apparent to those skilled in the art in the light of the foregoing description. Accordingly, it is intended to embrace all such alternatives, modifications and variations within the spirit and scope of the appended claims.

Invention is claimed as follows:

1. A method for the production of a lightweight cementitious product, which comprises forming an aqueous slurry of a settable cementitious composition and partially but not fully expanded beads of a material selected from the group consisting of polystyrene, polyethylene, and copolymers thereof, said beads having a density of from about 0.8 lbs./cu.ft. to about 10 lbs./cu.ft., depositing the slurry on a surface and applying heat to set and dry the composition, thereby forming a lightweight panel having high compressive strength.

2. A method according to claim 1, wherein said partially expanded beads are of polystyrene.

3. A method according to claim 2, wherein the density value ranges from about 1.10 to 2.0 times the density value of the expanded beads at full expansion.

4. A method according to claim 2, wherein the density value ranges from about 1.25 to about 2.0 times the density at full expansion.

5. A method according to claim 4, wherein said aqueous slurry contains from about 0.1 cm$^3$ to about 650 cm$^3$ of partially expanded beads per 100 g of stucco by dry weight.

6. A method according to claim 4, wherein said aqueous slurry contains from about 30 cm$^3$ to about 400 cm$^3$ per 100 gm of stucco by dry weight.

7. A method according to claim 1, wherein said cementitious composition is calcium sulfate hemihydrate.

8. A method according to claim 1, wherein said cementitious composition is cement.

9. A method according to claim 1, wherein said cementitious composition is deposited between two paper cover sheets.

10. The method of claim 1 wherein the slurry is heated to 110° F.

11. A lightweight gypsum wallboard panel produced by first forming an aqueous slurry of calcium sulfate hemihydrate and a partially but not fully expanded expandable beads of a material selected from the group consisting of polystyrene, polyethylene, and copolymers thereof, said beads having a density of from about 0.8 lbs. cu.ft. to about 10 lbs./cu.ft., depositing the slurry between two paper cover sheets, and applying heat to set the slurry and remove excess moisture and to complete the expansion of the polystyrene beads.

12. A panel according to claim 11, wherein said partially expanded beads are of polystryrene.

13. A panel according to claim 12, wherein said partially expanded beads are expanded to a density value that ranges from about 1.10 to 2.0 times the density value of the expanded beads at full expansion.

14. A panel according to claim 12, wherein said partially expanded beads are expanded to a density value that ranges from about 1.25 to about 2.0 times the density at full expansion.

15. A panel according to claim 14, wherein said aqueous slurry contains from about 0.1 cm$^3$ to about 650 cm$^3$ of partially expanded beads per 100 g of stucco by dry weight.

16. A panel according to claim 14, wherein said aqueous slurry contains from about 30 cm$^3$ to about 400 cm$^3$ per 100 gm of stucco by dry weight.

17. The wallboard panel of claim 11 wherein the expansion of the beads was completed at 110° F.

18. A lightweight cementitious product produced by first forming an aqueous slurry of a settable cementitious composition and partially but not fully expanded expandable beads of a material selected from the group consisting of polystyrene, polyethylene, and copolymers thereof, said beads having a density of from about 0.8 lbs./cu.ft. to about 10 lbs./cu.ft., depositing the slurry on a surface and applying heat to set and dry the composition and to complete the expansion of the beads.

19. The product of claim 17 wherein the expansion of the beads is completed at 110° F.

* * * * *

UNITED STATES PATENT AND TRADEMARK OFFICE
CERTIFICATE OF CORRECTION

PATENT NO. : 4,752,538
DATED : June 21, 1988
INVENTOR(S) : Larbi Bounini

It is certified that error appears in the above—identified patent and that said Letters Patent is hereby corrected as shown below:

On The Title Page:

In the Abstract:

Line 8, change "and" to --an--.

In the Specification:

Column 5, line 49, insert after "expanded" the word --expandable--.

Signed and Sealed this

First Day of November, 1988

Attest:

DONALD J. QUIGG

Attesting Officer

Commissioner of Patents and Trademarks